(12) United States Patent
Martin et al.

(10) Patent No.: US 7,821,401 B2
(45) Date of Patent: Oct. 26, 2010

(54) RFID TAG CONTAINING TWO TUNED CIRCUITS

(75) Inventors: Philippe Martin, Beaune (FR); David Malcolm Hall, Lockleys (AU)

(73) Assignee: Tagsys SAS (FR)

( * ) Notice: Subject to any disclaimer, the term of this patent is extended or adjusted under 35 U.S.C. 154(b) by 194 days.

(21) Appl. No.: 11/989,276

(22) PCT Filed: Jul. 5, 2006

(86) PCT No.: PCT/AU2006/000938

§ 371 (c)(1),
(2), (4) Date: Jan. 23, 2008

(87) PCT Pub. No.: WO2007/012109

PCT Pub. Date: Feb. 1, 2007

(65) Prior Publication Data

US 2009/0027208 A1      Jan. 29, 2009

Related U.S. Application Data

(60) Provisional application No. 60/703,145, filed on Jul. 28, 2005.

(51) Int. Cl.
G08B 13/14 (2006.01)
(52) U.S. Cl. ............... 340/572.5; 340/572.7; 340/572.8
(58) Field of Classification Search ............... 340/572.5, 340/572.8, 572.1, 572.7; 235/492
See application file for complete search history.

(56) References Cited

U.S. PATENT DOCUMENTS

| | | | |
|---|---|---|---|
| 5,510,769 A * | 4/1996 | Kajfez et al. | 340/572.5 |
| 6,340,932 B1 | 1/2002 | Rodgers et al. | |
| 6,824,054 B2 * | 11/2004 | Christoffers et al. | 235/451 |
| 7,286,053 B1 * | 10/2007 | Gudeman et al. | 340/572.1 |
| 7,339,481 B2 * | 3/2008 | Duron | 340/572.7 |
| 2001/0003438 A1 | 6/2001 | Imaichi et al. | |
| 2003/0016133 A1 | 1/2003 | Egbert | |
| 2005/0116826 A1 | 6/2005 | Wertsebrger | |
| 2005/0258966 A1 | 11/2005 | Quan | |

FOREIGN PATENT DOCUMENTS

GB    2 388 744 A    11/2003
WO    WO-00/44064 A1    7/2000

* cited by examiner

*Primary Examiner*—Thomas J Mullen
(74) *Attorney, Agent, or Firm*—Lerner, David, Littenberg, Krumholz & Mentlik, LLP

(57) ABSTRACT

An RFID tag is disclosed adapted to be read by an interrogator including a reader antenna having a carrier frequency. The tag includes a first circuit including a first inductor and a first capacitor, wherein the first circuit is tuned to a frequency above the carrier frequency to compensate for detuning in the presence of a plurality of tags. The RFID tag includes a second circuit including a second inductor and a second capacitor wherein the first and second inductors are arranged to be coupled electromagnetically with a coupling factor less than unity and the second circuit is tuned to increase coupling between the first circuit and the reader antenna. A method of reading an RFID tag in the presence of a plurality of tags is also disclosed.

39 Claims, 4 Drawing Sheets

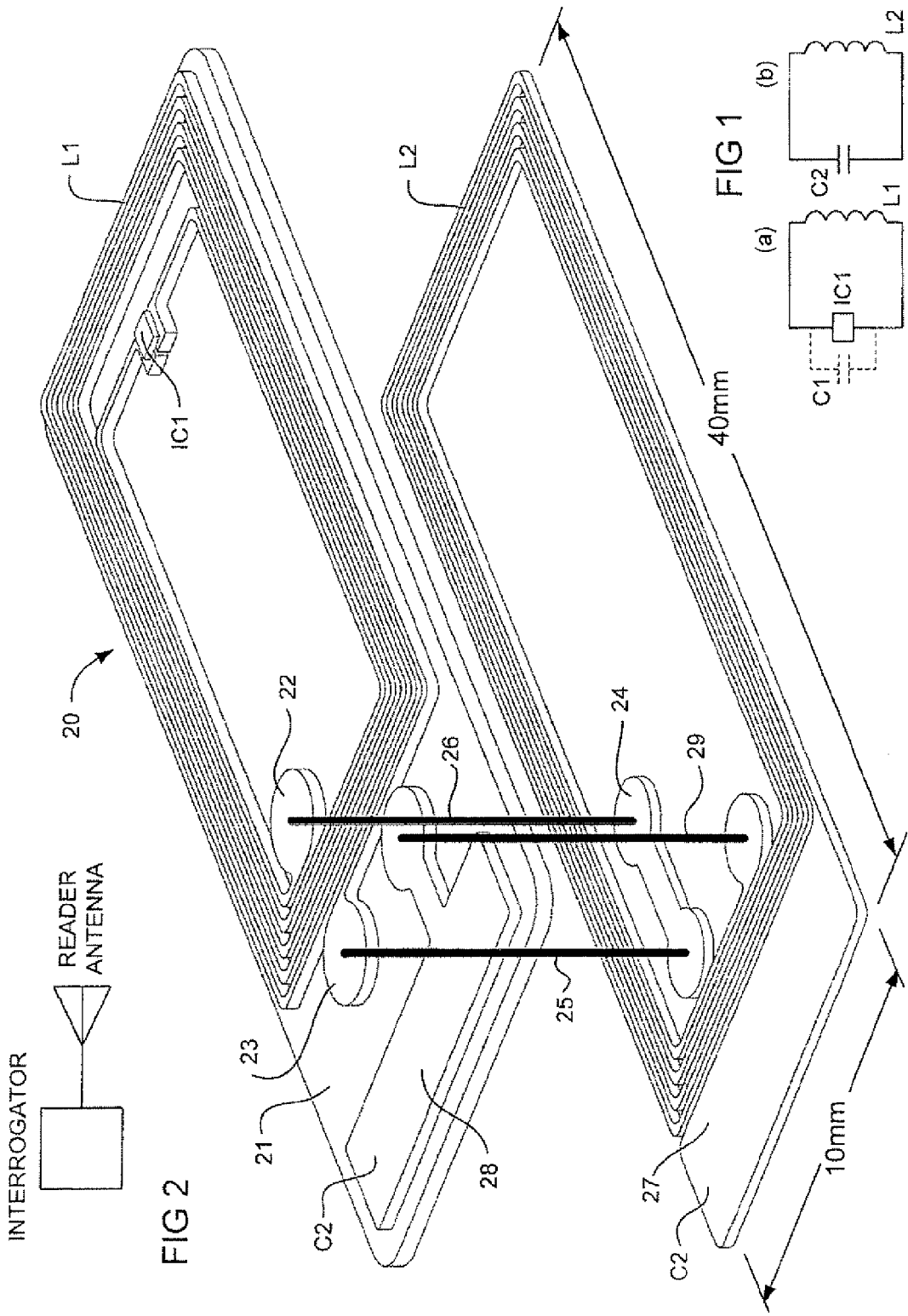

RFID TAG CONTAINING TWO TUNED CIRCUITS

CROSS-REFERENCE TO RELATED APPLICATIONS

The present application is a national phase entry under 35 U.S.C. §371 of International Application No. PCT/AU2006/000938 filed Jul. 5, 2006, published in English, which claims priority from U.S. Application No. 60/703,145, filed Jul. 28, 2005, all of which are incorporated herein by reference.

FIELD OF THE INVENTION

The present invention relates to a tag for an object management system wherein information bearing electronically coded radio frequency identification (RFID) tags are attached to objects which are to be identified, sorted, controlled and/or audited. In particular the present invention relates to an RFID tag containing two tuned circuits.

BACKGROUND OF THE INVENTION

The object management system of the present invention includes information passing between an interrogator or reader which creates an electromagnetic interrogation field, and the electronically coded tags, which respond by issuing a reply signal that is detected by the reader, decoded and consequently supplied to other apparatus in the sorting, controlling or auditing process. The objects to which the tags are attached may be animate or inanimate.

Under normal operation the tags may be passive, i.e. they may have no internal energy source and may obtain energy for their reply from the interrogation field, or they may be active and may contain an internal energy source, for example a battery. Such tags respond only when they are within or have recently passed through the interrogation field. The interrogation field may include functions such as signalling to an active tag when to commence a reply or series of replies or in the case of passive tags may provide energy, a portion of which may be used in constructing the reply.

A problem arises when tags to be read or written are in close proximity. Tags in close proximity are subject to detuning effects particularly when the tags are stacked on a common axis. Such stacking may occur when tags are affixed to a label of a shirt or the like and the shirts, which are on hangers, are hung from garment racks. More severe detuning may occur when the shirts are stacked on top of each other in a box when spacings are of the order of 4 mm. One way to compensate for the detuning effects may be to tune a tag to a resonant frequency higher that the operating carrier frequency of the interrogator or reader. The detuning effect then acts to lower the resonant frequency of the tag down to the carrier when placed on a common axis. However, this type of compensation is not very successful when spacings between the tags are less than about 10 mm.

Another prior art proposal is to dynamically shift the resonant frequency of the tag from within the tag's electronics. However, some level of power is required to maintain this circuit function during periods when the resonant frequency is shifted. In practice it is found that the field required to power an off-frequency tag often approaches that required to read a detuned tag. Hence this approach does not solve the problem of detuning. Also the approach uses on chip capacitance or a three terminal inductor rather than the typical two terminal inductor, adding to chip cost for three terminals.

Still other methods along the same idea as above use EEPROM cells to change the resonant frequency. Although no power is required to maintain the circuitry, fields greater than that required to read a detuned tag are required to revert the off-frequency tag back to normal once it is no longer required to be off-frequency. As well there is a need to command all tags other than the one desired to be read which adds time to the reading process and poses a problem with the protocol used in that there is a need to know which tag is desired to be read before reading it or performing detuning on a random basis.

A reference herein to a patent document or other matter which is given as prior art is not to be taken as an admission that that document or matter was, in Australia, known or that the information it contains was part of the common general knowledge as at the priority date of any of the claims.

An object of the present invention is to provide an RFID tag that addresses the problem of interference or detuning of tags that are in close proximity or to least alleviate the disadvantages of the prior art.

The tag described herein is not linked to protocol, thus making it compatible with chips already in the market place. Examples given are applicable to a carrier frequency of 13.56 MHz but the approach is not limited to this carrier frequency.

SUMMARY OF THE INVENTION

An RFID tag may contain two primary components, an antenna or coil which provides an interface to a data transfer medium, and an integrated circuit or chip which contains data and/or identity information along with electronic circuitry responsible for necessary support functions such as reply generation and a supply of power.

The present invention is based on a combined approach of tuning a tag to a resonant frequency higher than the carrier frequency of a reader together with a resonant circuit that is tuned to increase coupling from the tag to a reader antenna.

According to one aspect of the present invention there is provided an RFID tag adapted to be read by an interrogator including a reader antenna having a carrier frequency, said tag including:

a first circuit including a first inductor and a first capacitor, wherein said first circuit is tuned to a frequency above said carrier frequency to compensate for detuning in the presence of a plurality of tags;

a second circuit including a second inductor and a second capacitor; and wherein said first and second inductors are arranged to be coupled electromagnetically with a coupling factor less than unity and said second circuit is tuned to increase coupling between said first circuit and said reader antenna.

According to another aspect of the present invention there is provided a method of reading an RFID tag in the presence of a plurality of tags by an interrogator including a reader antenna having a carrier frequency, said tag including a first circuit having a first inductor and a first capacitor, said method including the steps of:

tuning said first circuit to a frequency above said carrier frequency to compensate for detuning in the presence of said tags;

providing a second circuit having a second inductor and a second capacitor;

electromagnetically coupling said first and second indicators with a coupling factor less than unity; and tuning said second circuit to increase coupling between said first circuit and said reader antenna.

The two tuned circuits may be provided on a common substrate. The first tuned circuit may include the first inductor and a chip. The chip may include the first capacitor. The second tuned circuit may include the second inductor and the second capacitor. The first and second inductors may be wound in the same sense around an axis such that an energising field may create a voltage in both inductors resulting in a current flowing around both inductors in the same conventional direction. The capacitance of the first tuned circuit may be located inside the chip or alternatively may be integrated on the substrate or added as a discrete element. The capacitance of the second tuned circuit may be integrated on the substrate or may be added as a discrete element. In some embodiments the first and second inductors may be connected at a common tapping point.

In further embodiments the first and/or second capacitor may include a parasitic element formed by capacitance between windings or tracks of the or each inductor. The parasitic capacitor(s) may be prepared by choosing an appropriate thickness and/or spacing between windings or tracks of the or each inductor. This may allow a tag to be manufactured without adding a discrete capacitor and may avoid an additional connection.

The first tuned circuit may be inductive and the second tuned circuit may be capacitive. The relative phases of currents in the circuits preferably range between 90 and 180 degrees. When several tags are stacked in close proximity, many inductors (first and second) may be well coupled with a range of currents up to +/−90 degrees from the carrier field. The extra second inductor may allow more inductors to be in close coupling relationship with each other (eg. a stack of 30 tags has 60 inductors). This may give rise to a mix of amplitudes and phases of magnetic field causing ripples in the resonance curve as each inductor is coupled to many inductors. If a peak of one of the ripples is arranged so that it occurs at the frequency of the carrier then extra tag performance may be obtained.

The inductor or coil associated with the first tuned circuit may be smaller in size and/or length than the inductor or coil associated with the second tuned circuit such that when the inductors are aligned on either side of an insulating substrate with one edge directly above the other, a region may exist in which the smaller first inductor causes flux to pass through an axial region of the second inductor in an opposite direction to flux flowing in the axial region of the rest of the second inductor. The region of opposite flux direction may lower the coupling factor from a value close to unity, for equal size loops, to around 0.7 wherein a coupling factor of 1 denotes that all of the flux of the first inductor passes through the second inductor.

In some embodiments the inductor or coil associated with the first tuned circuit may be the same size or larger in size and/or length than the inductor or coil associated with the second tuned circuit.

Assuming that the frequency of a carrier employed by an interrogator is 13.56 MHz, the first tuned circuit may be resonant at 15-20 MHz while the second tuned circuit may be resonant at 25-35 MHz. The frequency ranges may be chosen having regard to the final application of the tags including the number of tags and their proximity in use. In practice each tuned circuit may have a resonant frequency fixed at manufacture with the higher end of the range chosen when the tags are closely spaced and on axis.

For a single tag, the second tuned circuit may couple to the first tuned circuit with a coupling factor of around 0.7. However, because the second tuned circuit is further removed from the carrier frequency, the current flowing in the second tuned circuit may be relatively small due to the energising field and may have a relatively small effect on the first tuned circuit, the effect being a lowering of the resonant frequency of the first tuned circuit.

When a plurality of tags are stacked on a common axis the resonant frequencies of the first tuned circuits of the tags may be lowered significantly such that the energising field may no longer be strong enough to power the chips. The resonant frequencies of the second tuned circuits of the tags may also be lowered significantly, but as they were significantly higher than the carrier frequency to begin with, the new or lowered frequency may now be close to the carrier. The energising field may result in flow of relatively large currents in the second tuned circuits which may in turn couple more strongly (k=0.7) to the first tuned circuits, resulting in an increased current in the first tuned circuits to power the chips.

BRIEF DESCRIPTION OF THE DRAWINGS

A preferred embodiment of the present invention will now be described with reference to the accompanying drawings wherein:

FIG. 1(a) shows a circuit diagram of a first tuned circuit including a chip associated with a tag according to the present invention;

FIG. 1(b) shows a circuit diagram of a second tuned circuit associated with the tag;

FIG. 2 shows an exploded view of a tag according to one embodiment of the present invention;

DETAILED DESCRIPTION

Figure 3A:
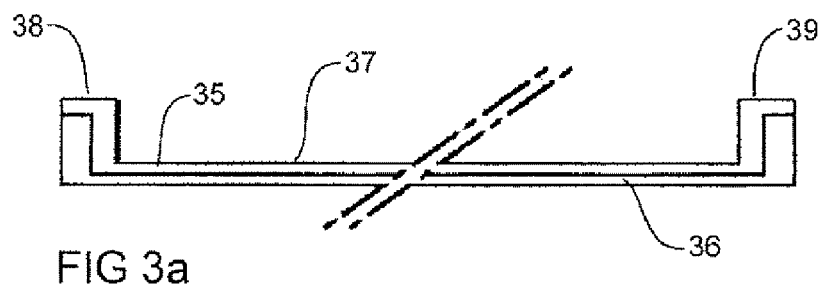
FIGS. 3(a) to 3(f) show components associated with a tag according to a further embodiment of the present invention.
Figure 3B:
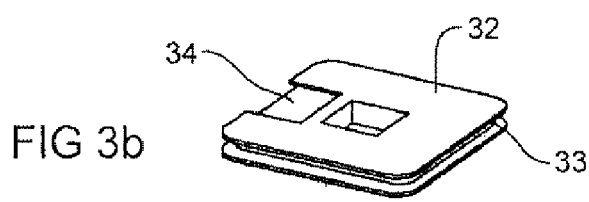
Figure 3C:
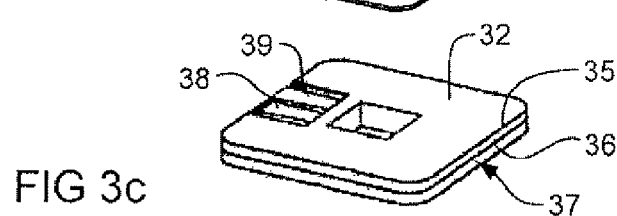
Figure 3D:
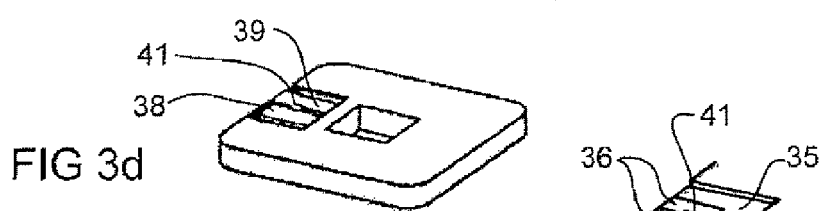
Figure 3E:
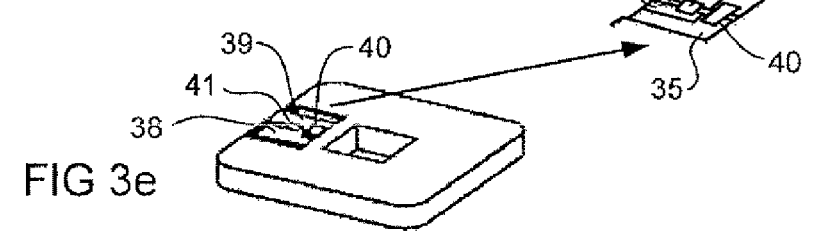
Figure 3F:
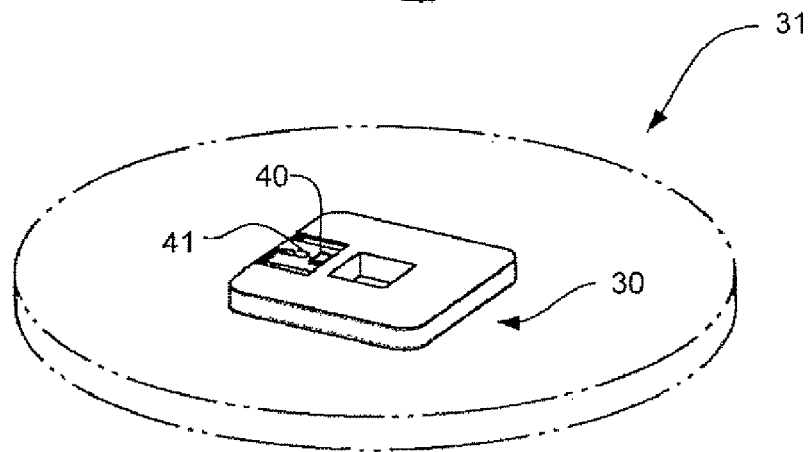

FIG. 1(a) shows a first circuit including an inductor $L_1$ and an integrated circuit chip $IC_1$ which contains data and/or identity information together with circuitry for support functions such as reply generation and power supply. Chip $IC_1$ includes an on board capacitor $C_1$. Alternatively capacitor $C_1$ may be formed outside of chip $IC_1$ such as on a substrate associated with the tag. By selecting a value for $L_1C_1$ the first circuit may be tuned to resonate at a frequency substantially between 15 to 20 MHz.

FIG. 1(b) shows a second circuit including an inductor $L_2$ and a capacitor $C_2$. The second circuit is formed such that it is electromagnetically coupled with the first circuit. The two circuits are preferably formed on a common substrate or support as this may simplify the manufacturing process and assembly of the tag. By selecting a value for $L_2C_2$ the second circuit may be tuned to resonate at a frequency substantially between 25 to 35 MHz.

FIG. 2 shows an exploded view of a tag 20 containing two tuned circuits according to an embodiment of the present invention. The tag 20 contains a first tuned circuit including inductor coil $L_1$ formed on one side of an insulating substrate 21. Substrate 21 is approximately 10 mm wide and 40 mm long. Integrated circuit chip $IC_1$ is connected to bridge a break in coil $L_1$ as shown. Chip $IC_1$ includes an on board capacitor ($C_1$) that also bridges the break in coil $L_1$.

The terminal ends 22, 23 of coil $L_1$ are electrically connected by a conductive bridge 24 formed on an opposite side of substrate 21. Ends 22, 23 are connected to bridge 24 via through conductors 25, 26 that may be established via an ultrasonic technique.

Tag 20 contains a second tuned circuit including inductor coil $L_2$ formed on the opposite side of substrate 21. The second tuned circuit includes capacitor $C_2$. One plate 27 of capacitor $C_2$ is formed on the opposite side of substrate 21 as shown. The other plate 28 of capacitor $C_2$ is formed on the one side of substrate 21 as shown. Plate 28 of capacitor $C_2$ is connected to coil $L_2$ on the opposite side of substrate 21 via through conductor 29 that may be established via an ultrasonic technique.

Coil $L_1$ is smaller in size and length than coil $L_2$. When the coils $L_1$ and $L_2$ are aligned on opposite sides of substrate 21 with one edge of each coil directly above the other, a region exists where coil $L_1$ causes magnetic flux to pass through the axial region of coil $L_2$. The flux produced by coil $L_1$ may be arranged to oppose the flux produced by coil $L_2$. The arrangement may reduce the coupling factor between coils $L_1/L_2$ from a value close to unity for equal size loops, to around 0.7.

FIGS. 3(*a*) to 3(*f*) show components of a tag 30 suitable for incorporating within a casino chip 31 that may be tracked electronically. Referring to FIG. 3(*b*) tag 30 includes a core body 32 formed of a plastics material. Core body 32 may be approximately 12 mm on each side and includes a peripheral groove 33 around its circumference. One face of core body 32 includes a recessed zone 34 adjacent an edge thereof.

FIG. 3(*a*) shows two conductors or wires 35, 36 formed on PET substrate 37. The substrate 37 and wires 35, 36 are approximately 50 cm long and not wider than groove 33 in core body 32. The wires 35, 36 are connected to terminal tabs 38, 39.

FIG. 3(*c*) shows substrate 37 including wires 35, 36 wound around peripheral groove 33 such that end tabs 38, 39 are located within recessed zone 34.

FIG. 3(*d*) shows an integrated circuit (IC) chip 40 connected to the two ends of wire 35 located on tabs 38, 39. A first tuned circuit is formed by the loops of wire 35 and IC chip 40 (including an onboard capacitor).

FIG. 3(*e*) shows a capacitor 41 connected to the two ends of wire 36 located on tabs 38, 39. A second tuned circuit is formed by the loops of wire 36 and capacitor 41.

The assembled tag 30 is moulded into a casino chip 31 that may be from 2.5 to 3 mm thick.

Figure 4:
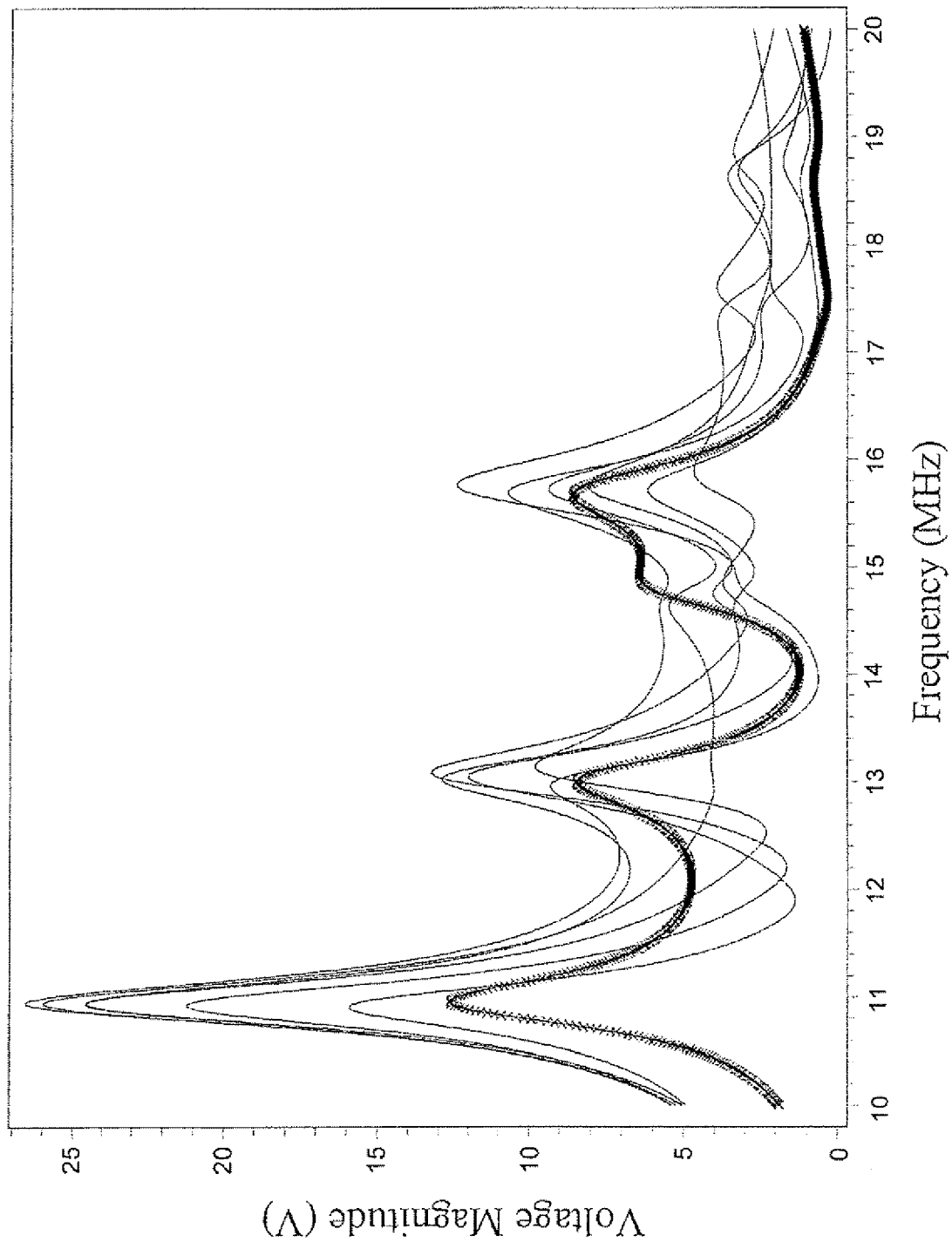
FIG. 4 shows the signals from a stack of conventional tags.

FIG. 4 shows the voltage magnitude of signals received from a stack of 7 conventional tags. At a frequency of 13.56 MHz the signal from the weakest tag is approximately 2 volts.

Figure 5:
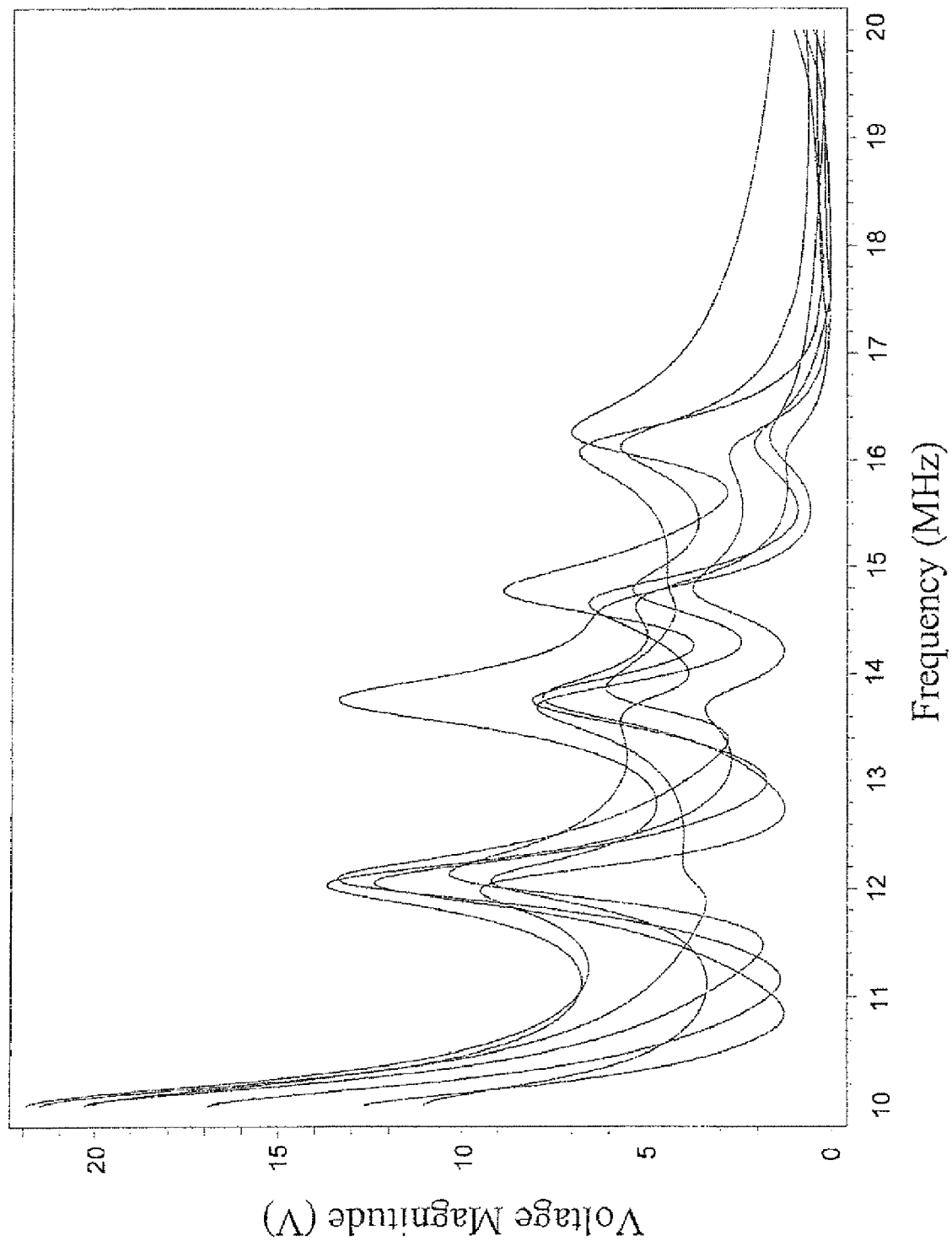
FIG. 5 shows the signals from a stack of tags according to the present invention.

FIG. 5 shows the signals received from a similar stack of tags that include two tuned circuits according to the present invention. It may be seen that with the extra tuned circuit the signal from the weakest tag is approximately 3 volts at a frequency of 13.56 MHz. This represents an improvement of 50% for the weakest tag.

Objects to which tags according to the present invention may be applied include casino chips and items of clothing such as shirts. The objects may also include optical data carriers such as DVD and CD media discs. The tag may be attached to a central portion of a CD/DVD media disc that is outside of a data storage portion of the media disc. The tag may be attached to an optical data carrier in any suitable manner and by any suitable means.

Finally, it is to be understood that various alterations, modifications and/or additions may be introduced into the constructions and arrangements of parts previously described without departing from the spirit or ambit of the invention.

The invention claimed is:

1. An RFID tag adapted to be read by an interrogator including a reader antenna having a carrier frequency, said tag including:
    a first circuit including a first inductor and a first capacitor, wherein said first circuit is tuned to a frequency above said carrier frequency to compensate for detuning in the presence of a plurality of tags;
    a second circuit including a second inductor and a second capacitor; and
    wherein said first and second inductors are arranged to be coupled electromagnetically with a coupling factor less than unity and said second circuit is tuned to increase coupling between said first circuit and said reader antenna.

2. A tag according to claim 1 wherein said first circuit includes a chip.

3. A tag according to claim 2 wherein said chip includes said first capacitor.

4. A tag according to claim 1 wherein said coupling factor is substantially 0.7.

5. A tag according to claim 1 wherein said first inductor includes a first loop and said second inductor includes a second loop larger than said first loop.

6. A tag according to claim 5 wherein an edge of said first loop is aligned with an edge of said second loop.

7. A tag according to claim 5 wherein said first and second loops are concentric.

8. A tag according to claim 5 wherein said first and second loops are eccentric.

9. A tag according to claim 5 wherein said second capacitor includes a parasitic capacitor formed by capacitance between windings of said second loop.

10. A tag according to claim 1 wherein said first and second inductors are connected at a common tapping point.

11. A tag according to claim 1 wherein said first and second inductors are formed on a common substrate.

12. A tag according to claim 11 wherein said first and second inductors are formed on opposite sides of said common substrate.

13. A tag according to claim 11 wherein said first and second inductors are formed on the same side of said common substrate and are separated by an insulator.

14. A tag according to claim 1 wherein said first and second inductors are formed on separate substrates.

15. A tag according to claim 1 wherein said first and second inductors are wound in the same sense.

16. A tag according to claim 1 wherein said second circuit is tuned above the frequency of said first circuit.

17. A tag according to claim 16 wherein said second circuit is tuned between 80-160% above the frequency of said carrier.

18. A tag according to claim 1 wherein said first circuit is tuned between 10-50% above the frequency of said carrier.

19. A tag according claim 1 wherein said carrier is 13.56 MHz, said first circuit is tuned to between 15-20 MHz and said second circuit is tuned to between 25-35 MHz.

20. An optical data carrier including a tag according to claim 1.

21. A method of reading an RFID tag in the presence of a plurality of tags by an interrogator including a reader antenna having a carrier frequency, said tag including a first circuit having a first inductor and a first capacitor, said method including the steps of:
    tuning said first circuit to a frequency above said carrier frequency to compensate for detuning in the presence of said tags;

providing a second circuit having a second inductor and a second capacitor;

electromagnetically coupling said first and second indicators with a coupling factor less than unity; and tuning said second circuit to increase coupling between said first circuit and said reader antenna.

22. A method according to claim 21 wherein said first circuit includes a chip.

23. A method according to claim 22 wherein said chip includes said first capacitor.

24. A method according to claim 21 wherein said coupling factor is substantially 0.7.

25. A method according to claim 21 wherein said first inductor includes a first loop and said second inductor includes a second loop larger than said first loop.

26. A method according to claim 25 wherein an edge of said first loop is aligned with an edge of said second loop.

27. A method according to claim 25 wherein said first and second loops are concentric.

28. A method according to claim 25 wherein said first and second loops are eccentric.

29. A method according to claim 25 wherein said second capacitor includes a parasitic capacitor formed by capacitance between windings of said second loop.

30. A method according to claim 21 wherein said first and second inductors are connected at a common tapping point.

31. A method according to claim 21 wherein said first and second inductors are formed on a common substrate.

32. A method according to claim 31 wherein said first and second inductors are formed on opposite sides of said common substrate.

33. A method according to claim 31 wherein said first and second inductors are formed on the same side of said common substrate and are separated by an insulator.

34. A method according to claim 21 wherein said first and second inductors are formed on separate substrates.

35. A method according to claim 21 wherein said first and second inductors are wound in the same sense.

36. A method according to claim 21 including tuning said second circuit above the frequency of said first circuit.

37. A method according to claim 36 wherein said second circuit is tuned between 80-160% above the frequency of said carrier.

38. A method according to claim 21 wherein said first circuit is tuned between 10-50% above the frequency of said carrier.

39. A method according to claim 21 wherein said carrier is 13.56 MHz, said first circuit is tuned to between 15-20 MHz and said second circuit is tuned to between 25-35 MHz.

* * * * *